Patented Mar. 19, 1935

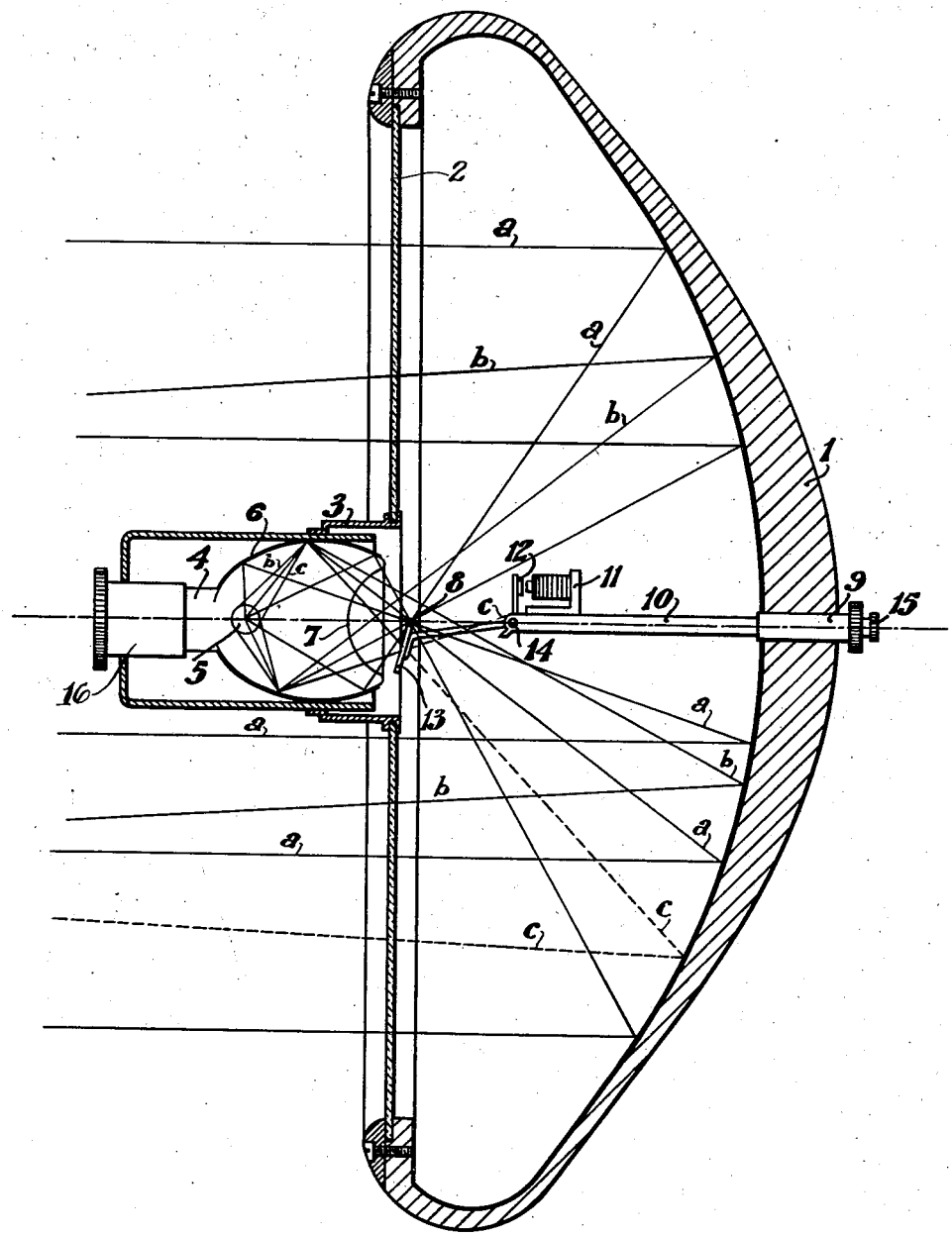

1,995,012

UNITED STATES PATENT OFFICE 1,995,012

LIGHTING DEVICE

Louis Rivier, Jouxtens, Switzerland

Application May 6, 1933, Serial No. 669,749
In Switzerland May 13, 1932

3 Claims. (Cl. 240—41.1)

This invention relates to lighting devices which are especially suited for vehicle headlights and which are of the general type as those described in my co-pending application Ser. No. 514,645, but in which use is made of light bulbs of the kind described in my co-pending application Ser. No. 614,083.

The principal object of this invention is to provide an improved apparatus capable of projecting a powerful parallel beam by the use of a novel arrangement of reflectors combined with a screen for completely suppressing any dazzling effects by preventing projections of any rays which may produce glare, but without diminishing the intensity of the parallel beam.

Other objects and advantages will appear from the following description of the accompanying drawing which represents an axial section through one form of a vehicle headlight.

The represented headlight comprises a reflector 1 having the shape of a paraboloid of revolution the parameter of which is considerably greater than that of ordinary parabolic headlights. In its centre the glass 2 carries a mounting 3 destined to receive the socket 16 of a lamp 4. A part 6 of the bulb of this lamp has the shape of an ellipsoid of revolution and is silvered so as to be specular for the rays coming from the filament 5 situated in the neighbourhood of one of the foci of the ellipsoid. The lamp 4 is disposed so that the axis of the ellipsoid coincides with that of the paraboloid 1 and that the second focus of the ellipsoid which is at a distance from the filament 5 coincides with the focus of the paraboloid.

The bulb of the lamp 4 is moreover provided with a transparent portion 7 which projects into the interior of the ellipsoid and is preferably a spherical surface the centre of which is in the focus 8. This focus is thus on the outside of the lamp 4, so that it is easy to place into its neighbourhood a body destined to be struck by certain of the rays of the source of light which are emitted in directions which do not contain the first focus. Among these rays are rays $b$ and rays $c$ which differ from each other by the direction which they take relatively to the axis of the paraboloid after their reflection from the parabolic surface. The rays $b$ are those which are finally directed downwardly and the rays $c$ those which are finally directed upwardly. As in antiglare headlights all ascending rays should be eliminated, a light screen 13 is provided which stops the rays $c$ represented for this reason in dotted lines in the eliminated portion of their trajectory. As these rays $c$ are those which are reflected by the ellipsoid so as to pass beneath the focus 8, they can all be stopped by the screen 13 when this screen extends downwardly from the focus 8 and this focus is just situated on the upper edge of the screen. This edge divides then the source constituted by the image formed about this focus in two parts. The rays $c$ can however be utilized for full illumination if desired. The screen 13 is mounted on a lever 12 rotatable on an axis 14 and carrying the armature of an electromagnet 11. This lever is subjected to a retracting spring, not shown, which, when the magnet is deenergized, pulls the screen slightly downwards from the represented position to move its upper edge out of the immediate neighbourhood of the focus 8.

The support 10 of the screen is mounted in a sleeve 9 and is provided with a head 15 permitting adjustment of the position of the screen when mounting a new bulb. The conductors leading to the electromagnet are not represented. The circuit of this latter comprises a switch placed on the dash board of the vehicle. When the headlight is to be rendered nondazzling, the circuit of the electromagnet 11 is closed, which has the effect to bring the edge of the screen to the focus 8. A nonmagnet stop piece interposed between the core and the armature can for example determine this position.

The spherical form given to the transparent part 7 of the bulb presents the advantage that this part is traversed without deflection by the rays which are concentrated to the focus. The shape of this part can however differ from the spherical shape and be even convex instead of concave.

The two foci of the ellipsoid may also be situated in the interior of the bulb and a screen is placed in this bulb so that its edge contains that of the two foci which does not contain the light source.

The fact that the parameter of the parabolic reflecting surface is relatively great compared with that of the reflectors of usual headlights can be recognized in the drawing where it is seen that the reflecting surface extends from the vertex of the paraboloid not even to its focal plane. It follows that the image of the light source reflected to the focus 8 is small relative to the size of the parabolic reflecting surface and the rays $b$, as also the rays $c$ existing when the screen 13 is lowered, which rays do not pass exactly through the focus 8, are only very little inclined relative to the horizontal.

The screen 13 in the figure may be disposed perpendicularly to the axis of the ellipsoid and can constitute a mirror to return the rays c into the ellipsoid where they will be reflected several times and finally leave the ellipsoid in the same direction as the rays b.

The electromagnetic control means for the screen may comprise one or several solenoids of which the field controls the position of a magnetic screen or of a screen connected to a magnetic member.

It is also possible to dispose the elliptic bulb at an angle to the axis of the paraboloid.

I claim:

1. A lighting device comprising a parabolic reflector, a lamp bulb, a source of light contained in the bulb, a portion of the bulb forming an elliptical reflector having the source of light placed in one of its foci, the other focus coinciding with that of the parabolic reflector whereby a portion of the light rays emitted by the source of light will be concentrated through said common focus of the elliptical and parabolic reflectors to impinge upon the parabolic reflector, a movable light screen adapted to intersect a portion of those light rays which are not concentrated through said common focus, and electromagnetically operated means for approaching the screen to, or moving it away from said common focus.

2. A light projector comprising a parabolic reflecting surface formed by that part of a paraboloid of revolution extending from the vertex not further than to its focal plane, a bulb containing an electric incandescent light source, a socket for the bulb disposed opposite the parabolic reflector on the axis thereof, a portion of said bulb forming a reflector of the shape of a fragment of an ellipsoid of revolution having its axis coinciding with the axis of the parabolic reflector, the proximate focus of said ellipsoidal reflector being situated in the light source and the remote focus being situated outside of the bulb and coinciding with the focus of the parabolic reflector, the portion of the bulb situated on the side of the remote focus being transparent whereby the reflecting portion of the bulb compels the rays of the light source to converge to the region of the common focus of the parabolic and the elliptical reflector and to pass to the parabolic reflector, and a light screen having an edge extending in close proximity of said common focus and extending on one side only of the common axis of the two reflectors to prevent any rays from passing to the parabolic reflector which after reflection thereby would pass out as glare rays.

3. A light projector comprising a parabolic reflector surface formed by that part of a paraboloid of revolution extending from the vertex not further than to its focal plane, an electric light bulb containing a light source, a portion of the bulb forming a reflecting surface in the shape of a fragment of an ellipsoid of revolution having its proximate focus situated in the light source and having its remote focus situated outside of the bulb and coinciding with the focus of said parabolic reflector, said elliptical reflector compelling the rays of the light source to converge to the region of the common focus of the elliptical and parabolic reflectors and to pass to the parabolic reflecting surface, a movable light screen disposed on one side of the axis of the parabolic reflector and provided with an edge adapted to be brought into close proximity of said common focus to prevent any rays from passing to the parabolic reflector which after reflection thereby would pass out as glare rays, means for moving the light screen into proximity of and away from said common focus, and means for adjusting the position of the light screen.

LOUIS RIVIER.